3,252,903
EMULSION DRILLING FLUID
Bob C. Crittendon, Midland, Tex., assignor, by mesne
assignments, to Socony Mobil Oil Company, Inc., New
York, N.Y., a corporation of New York
No Drawing. Filed Sept. 8, 1958, Ser. No. 759,433
36 Claims. (Cl. 252—8.5)

This application is a continuation-in-part of my copending application Serial No. 421,953, filed April 8, 1954, now abandoned.

This invention relates to drilling fluids and relates more particularly to an emulsion drilling fluid.

In the rotary drilling of wells, such as those for petroleum oil or gas, a drilling fluid is continuously circulated from the surface of the ground to the bottom of the well borehole and back to the surface of the ground again. The drilling fluid has various functions including those of lubricating the drill bit and pipe, carrying cuttings from the bottom of the well borehole to the surface of the ground, and imposing a hydrostatic head on the drilled formations to prevent escape of oil, gas, or water therefrom into the well borehole during the drilling operations. Ordinarily, aqueous drilling fluids comprising a suspension of clay and water are employed. Aqueous drilling fluids are limited in the extent to which their specific gravities can be reduced and, where reduced specific gravities are required, drilling fluids having a fluid phase consisting entirely of an emulsion of oil in water can be used.

Oil-in-water emulsion drilling fluids are less expensive and more convenient to handle than drilling fluids having a fluid phase consisting entirely of oil and, therefore, of these two types, the oil-in-water emulsion drilling fluids are usually preferred. On the other hand, the oil-in-water emulsion drilling fluids, in common with aqueous drilling fluids, have been recognized to damage oil-producing formations by reason of filtration of water from the fluid into the formation with consequent reduction in permeability of the formation and reduced rate of oil production. To avoid the damage to the formation arising from the use of aqueous and oil-in-water emulsion drilling fluids and yet retain advantages of the oil-in-water and the drilling fluids whose fluid phase consists entirely of oil, the use of water-in-oil emulsion drilling fluids has been proposed. However, while effective for the purposes intended, water-in-oil emulsion drilling fluids are frequently unstable and the emulsions tend readily to break or to revert to oil-in-water emulsions.

It is an object of this invention to provide a water-in-oil emulsion drilling fluid. It is another object of this invention to stablize water-in-oil emulsion drilling fluid. It is another object of this invention to improve the rate of production from oil-producing earth formations. It is another object of this invention to provide a method for converting aqueous drilling fluid to water-in-oil emulsion drilling fluid. It is another object of this invention to provide a composition for use in the preparation of a water-in-oil emulsion drilling fluid. It is another object of this invention to provide a fluid for use in completing a well in an oil-producing earth formation. It is another object of this invention to provide a drilling fluid of lower density than aqueous base drilling fluid. These and other objects of the invention will become apparent from the following detailed description.

In accordance with the invention, there is provided a water-in-oil emulsion containing an agent comprising a water-insoluble salt of a sulfuric acid derivative of an organic compound. In accordance with an embodiment of the invention, there are provided for admixture with water and oil to produce water-in-oil emulsion a water-insoluble salt of a sulfonated hydrocarbon and a compound having emulsifying properties and being a water-insoluble salt of a sulfuric acid derivative of an aliphatic ester, a substituted oxazoline, a derivative of a polyoxyalkylene, or an ester of sorbitan. There is also provided water-insoluble salt of a resin acid which is preferably employed, in addition to the water-insoluble salt of a sulfonated hydrocarbon and a compound having emulsifying properties and being a water-insoluble salt of a sulfuric acid derivative of an aliphatic ester, a substituted oxazoline, a derivative of polyoxyalkylene, or an ester of sorbitan, in admixture with water and oil to produce water-in-oil emulsion.

The water-in-oil emulsion can be employed for the treatment of oil-producing formations. However, the emulsion has specific and preferred use in a well borehole during mechanical penetration of an oil-producing formation. In a restricted sense, the emulsion is preferably employed as a drilling fluid. In another sense, the emulsion is employed as a completion fluid.

The continuous phase of the emulsion is oil and the discontinuous phase is water. The oil employed as the continuous phase of the emulsion may be any oil heretofore employed or otherwise suitable for use in emulsion drilling fluids. The oil may be a mineral or hydrocarbon oil such as petroleum crude oil, diesel oil, fuel oil, gas oil, and the like. The oil may also be an animal or vegetable oil. However, mineral oils are to be preferred because of availability and economy. The oil phase constitutes between about 20 percent and 85 percent by volume of the emulsion. By virtue of the fact that the oil phase may constitute as high as about 85 percent by volume of the emulsion, the emulsion will have a low density as compared with aqueous drilling fluid. It will be understood, however, that the volume of oil with respect to the volume of water in the emulsion may vary depending upon the use to which the emulsion is put and the properties desired for the effects to be achieved.

Any water-insoluble salt of a sulfuric acid derivative of an organic compound may be employed. By sulfuric acid derivative of an organic compound is meant a compound obtainable by reaction between the organic compound and sulfuric acid. The nomenclature of these compounds is not uniform. They are variously termed as being sulfated or sulfonated regardless of composition. These compounds are obtained by reaction of an organic compound with sulfuric acid, including fuming sulfuric acid. They are also obtained by reaction of an organic compound with an agent capable of forming the sulfated or sulfonated compounds. Such agents include sulfates, acid sulfates, sulfites, acid sulfites, sulfur trioxide, chlorosulfonic acid and others. The compounds may be formed directly or indirectly through the formation of intermediate compounds. For purposes of description herein, the sulfuric acid derivatives will be termed as sulfonates.

A preferred water-insoluble salt of a sulfuric acid derivative of an organic compound is a water-insoluble salt of a sulfonated hydrocarbon. A preferred water-insoluble salt of a sulfonated hydrocarbon is that of a sulfuric acid derivative of an aromatic hydrocarbon. Another water-insoluble salt of a sulfuric acid derivative of an organic compound that may be employed is a water-insoluble salt of a sulfuric acid derivative of an aliphatic ester. Where a water-insoluble salt of a sulfonated hydrocarbon is employed, particularly that of a sulfonated aromatic hydrocarbon, there is also employed a water-insoluble salt of a sulfuric acid derivative of an aliphatic ester of a substituted oxazoline, a derivative of a polyoxyalkylene, or an ester of sorbitan.

The water-insoluble salt of the sulfuric acid derivative of the organic compound particularly that of a sulfonated hydrocarbon need not be a single compound. The salt may be in admixture with other water-insoluble salts of sulfuric acid derivatives of organic compounds or in admixture with compounds other than water-insoluble salts of sulfuric acid derivatives of organic compounds. A preferred type of water-insoluble salt of sulfonated hydrocarbon is a water-insoluble salt of petroleum sulfonate. In the preparation of petroleum sulfonate, petroleum oil, which may be crude or refined petroleum oil, is subjected to the sulfonation treatment. The petroleum oil is a mixture of various hydrocarbons and the resulting sulfonate will be a mixture of various sulfonated hydrocarbons. The water-insoluble salts prepared from petroleum sulfonate will therefore be a mixture of salts of various sulfonated hydrocarbons.

In connection with a water-insoluble salt of petroleum sulfonate, there may be a variation in the degree of effectiveness of the salt depending upon the petroleum sulfonate from which the salt is obtained. Petroleum oil will vary in the relative proportion of aromatic, naphthenic, and paraffinic hydrocarbons and in the molecular weights of the constituents of the petroleum oil. The petroleum sulfonate will also vary as a result in differences in the degree of sulfonation of the petroleum oil. When employing water-insoluble salts of petroleum sulfonates, various amounts may be required, in view of the variations in degree of effectiveness, to obtain a desired effect.

The water-insoluble salt of petroleum sulfonate to be employed in the practice of the invention is a water-insoluble salt of the so-called "mahogany acid." A water-insoluble salt of a petroleum sulfonate found to be satisfactory is a salt of a petroleum sulfonate which contains by weight about 62 percent of sulfonate, 33 percent of mineral oil, and 5 percent of water. The molecular weights of this sulfonate are between about 440 and 470.

Water-insoluble salts of sulfonated aromatic hydrocarbons which may be specifically mentioned are those of isopropylnaphthalene sulfonate, dodecylbenzene sulfonate, tetrahydronaphthalene sulfonate, monoethyl, phenylphenol sulfonate, cetylnaphthalene sulfonate, sulfonated oleyl esters of phenolaldehyde condensation products, oleylphenoxyacetate sulfonate, and sulfonaphthylstearic acid.

The water-insoluble salt of a sulfuric acid derivative of an aliphatic ester may be any water-insoluble salt of any sulfuric acid derivative of any aliphatic ester. The aliphatic esters, however, must contain a total of at least 10 carbon atoms in the combined acid and alcohol portion of the ester in order that the esters have satisfactory emulsifying properties. A particular type of aliphatic ester is an animal oil or vegetable oil. By animal oil is meant an oil having an origin in a living organism capable of independent motion and, accordingly, the oil may have an origin in fish. While any water-insoluble salt of any sulfuric acid derivative of any aliphatic ester may be employed, the water-insoluble salts of sulfonated animal and vegetable oils have been found to be particularly useful. Preferably, the water-insoluble salts of sulfonated sperm oil, whale oil, fish oil, seal oil, cottonseed oil, olive oil, rapeseed oil, and peanut oil are employed.

Any substituted oxazoline having emulsifying properties may be employed. The substituted oxazolines should have a molecular weight of the order of 300 to 350. Oxazoline stearate, linoleate, and linolinate have been found to be satisfactory.

Any derivative of a polyoxyalkylene having emulsifying properties may be employed. In order that a derivative of a polyoxyalkylene having emulsifying properties be satisfactory for use, it should contain at least two oxyalkylene groups and contain at least six carbon atoms linked together. The carbon atoms may be in an alkyl or aryl radical. The polyoxyalkylene may be a polyoxyethylene, a polyoxypropylene, or a higher polyoxyalkylene. Suitable derivatives of polyoxylalkylenes are phenyl polyoxyethylene, substituted phenyl polyoxyethylene, polyoxyethylene sorbitol oleate, polyoxyethylene sorbitol stearate, polypropylene sorbitol stearate, and polyoxypropylene sorbitol laureate.

The esters of sorbitan may be mono- and poly-stearates and mono- and poly-oleates of sorbitan.

The water-insoluble salt of resin acid may be any water-insoluble salt of any resin acid. The resin acids are acids derived from vegetable products of secretion or disintegration. Example of suitable resin acids are wood rosins and tall oil.

In connection with the use of a water-insoluble salt of a sulfuric acid derivative of an organic compound, particularly that of a sulfonated hydrocarban and of a sulfuric acid derivative of an aliphatic ester, and the water-insoluble salt of a resin acid, any salt which is water-insoluble may be employed. However, the salt is preferably an alkaline earth metal salt, namely, a calcium, barium, magnesium, or strontium salt. The salt may also be an iron, aluminum, zinc, or cadmium salt. Of the salts, the calcium salt is to be particularly preferred.

The water-insoluble salt of a sulfuric acid derivative of an organic compound particularly that of a sulfonated hydrocarbon is preferably employed in the amount of about 5 to 15 pounds per barrel. Where a water-insoluble salt of a sulfonated hydrocarbon is employed, the compound having emulsifying properties and being a water-insoluble salt of a sulfuric acid derivative of an aliphatic ester, a substituted oxazoline, a derivative of a polyoxyalkylene, or an ester of sorbitan used therewith is preferably employed in the amount of about 2.5 to about 7.5 pounds per barrel of the emulsion and desirably is employed in an amount which is about one-half of the amount of the water-insoluble salt of the sulfonated hydrocarbon. The water-insoluble salt of a resin acid is preferably employed, where used, in the amount of about five pounds per barrel of the emulsion.

It is preferred that the emulsion contain admixed therewith a water-soluble salt of an alkaline earth metal. I have found that the presence of such a salt in the emulsion tends to enhance the stability of the emulsion. Calcium chloride has been found to be satisfactory. However, other water-soluble salts of the alkaline earth metals, namely, calcium, barium, magnesium, and strontium, may be employed. Generally, the water-soluble salt of the alkaline earth metal may be employed in an amount of about five pounds per barrel of the emulsion.

It is also preferred that the emulsion contain admixed therewith an alkaline earth metal hydroxide. I have found that such a hydroxide also has a stabilizing effect on the emulsion. Calcium hydroxide is preferred. The hydroxide may be used in amounts up to about two pounds per barrel of the emulsion.

In practice, where a water-insoluble salt of the sulfonated hydrocarbon and the compound having emulsifying properties and being a water-insoluble salt of a sulfuric acid derivative of an aliphatic ester, a substituted oxazoline, a derivative of a polyoxyalkylene, or an ester of sorbitan are employed, these materials can be added singly to the emulsion or a component of the emulsion. However, it is usually more convenient to add these materials in admixture with each other to the emulsion or a component of the emulsion. In such cases, the water-insoluble salt of the sulfonated hydrocarbon and the compound having emulsifying properties and being a water-insoluble salt of a sulfuric acid derivative of an aliphatic ester, a substituted oxazoline, a derivative of a polyoxyalkylene, or an ester of sorbitan may be admixed together at a central location and shipped in suitable containers or otherwise transported from the central location to the well site or other suitable location for use in the emulsion. However, each or all of the water-insoluble salts of resin acid, the water-soluble salt of an alkaline earth metal and the hydroxide of alkaline earth metal, where used, may be admixed with the water-insoluble salt of the sulfonated hydrocarbon and the compound having emulsifying properties and being a water-insoluble salt of a sulfuric acid derivative of an aliphatic ester, a substituted oxazoline, a derivative of a polyoxyalkylene, or an ester of sorbitan.

If desired, the water-insoluble salt of the sulfuric acid derivative of an organic compound particularly that of the sulfonated hydrocarbon may be formed from a water-soluble salt of the sulfuric acid derivative of the organic compound particularly that of the sulfonated hydrocarbon either prior or subsequent to admixture with the emulsion or a component of the emulsion. Thus, a water-soluble salt of a sulfonated hydrocarbon may be admixed, prior to admixture with the emulsion or a component of the emulsion, with a salt whose cation will replace the cation of the water-soluble salt of the sulfonated hydrocarbon to form a water-insoluble salt of the sulfonated hydrocarbon. For example, a sodium salt of a sulfonated hydrocarbon may be reacted with calcium chloride to form a water-insoluble calcium salt of the sulfonated hydrocarbon and this may be done just prior to admixture of the water-soluble salt of the sulfonated hydrocarbon with the emulsion or a component of the emulsion or may be done subsequent to admixture of the water-soluble salt of the sulfonated hydrocarbon with the emulsion or component of the emulsion. Similarly, the water-insoluble salt of a sulfuric acid derivative of an aliphatic ester, where used, and the water-insoluble salt of a resin acid, where used, may be formed from a water-soluble salt of a sulfuric acid derivative of the aliphatic ester or a water-soluble salt of the resin acid, respectively, either prior or subsequent to admixture with the emulsion or component of the emulsion. It will be understood, of course that each or all of a water-soluble salt of a sulfuric acid derivative of an organic compound particularly that of a sulfonated hydrocarbon, a water-soluble salt of a sulfuric derivative of an aliphatic ester, and a water-soluble salt of a resin acid may be converted to the respective water-insoluble salt when in admixture with each other. It is preferred, where converting a water soluble salt of a resin acid to a water-insoluble salt and the conversion is effected while the water-soluble salt of the resin acid is in admixture with the emulsion or component of the emulsion, to employ a metal hydroxide whose cation will replace the cation of the water-soluble salt of the resin acid. Preferably, calcium hydroxide is employed.

As stated, a water-soluble salt of a sulfuric acid derivative of an organic compound particularly that of a sulfonated hydrocarbon and, where used, a water-soluble salt of a sulfuric acid derivative of an aliphatic ester and a water-soluble salt of a resin acid may be converted to the respective water-insoluble salt after admixture with the emulsion or a component of the emulsion. It has been found satisfactory, for example, to admix a water-soluble salt of a sulfonated hydrocarbon with all or part of the oil employed for the emulsion. The compound having emulsifying properties and being a water-soluble salt of a sulfuric acid derivative of an aliphatic ester, a substituted oxazoline, a derivative of a polyoxyalkylene, or an ester of sorbitan may also be admixed with all or part of the oil employed for the emulsion. Thereafter, the salt whose cation will react with the water-soluble salt to convert it to a water-insoluble salt is added to the mixture and permitted to react with the salt of the sulfonated hydrocarbon, and with the salt of the sulfuric acid derivative of an aliphatic ester if used. The water for the emulsion which water may have been previously admixed with clay or other desired drilling fluid additive, is added to the mixture. Thereafter, the water-insoluble salt of a resin acid may be added. Alternatively, a water-soluble salt of the resin acid may be added and the water-soluble salt converted to a water-insoluble salt while in admixture with the other materials.

Where conversion to a water-insoluble salt of a sulfuric acid derivative of an organic compound particularly that of a sulfonated hydrocarbon, a water-insoluble salt of a sulfuric acid derivative of an aliphatic ester, or a water-insoluble salt of a resin acid is effected, the amount of salt whose cation will replace the cation of the water-soluble salts should be employed in an amount equal to the stoichiometric amount. However, an amount in excess of the stoichiometric amount has been found to be desirable. Apparently, the excess amount results in a more rapid and complete conversion to the respective water-insoluble salt. Further, where the salt employed for conversion is a water-soluble salt of an alkaline earth metal or is an alkaline earth metal hydroxide, the excess may constitute part or all of the salt or hydroxide, respectively, which is preferably added, as previously indicated.

Where the emulsion is employed under such conditions that it will attain, at least temporarily, a temperature in excess of 180° F., it is preferred to admix therewith a drying oil. For example, the drying oil will be admixed therewith where the emulsion is employed as a drilling fluid for the drilling of deep formations. By drying oil, I mean an oil which will oxidize, polymerize, or otherwise form a water-insoluble and oil-insoluble material when exposed to air or other oxidizing medium. The drying oil will form a water-insoluble and oil-insoluble material in the fluid and this material will reduce any loss of oil or water to the porous earth formations penetrated by the well. The drying oil may be used in an amount sufficient to reduce any loss of oil or water, known as filter loss, to a satisfactory value. For example, the material may be employed in an amount between about 0.5 and 10 pounds per barrel of drilling fluid. However, larger amounts may be required where the temperature attained by the drilling fluid may be much above 180° F. Linseed oil has been found to be satisfactory although poppy seed oil and tung oil, and other types of drying oils may be employed.

Where the temperature of the emulsion will exceed about 200° F., the amount of drying oil added thereto for the purpose of reducing filter loss to a desired value may become excessive. Accordingly, it is preferred to add to the emulsion an oil reactive resin. By oil reactive resin, I mean a phenol-formaldehyde product which, dissolved in oil, will react with it and form a quick hardening varnish. The oil reactive resins reduce the filter loss of the emulsion and while various types of these materials are effective, superior results have been obtained employing a sulfonated phenol-formaldehyde resin.

The emulsion may contain, as desired, other materials. For example, where employed as a drilling fluid, the emulsion may contain clays, weighting agents, and other materials commonly employed for various purposes in drilling fluids. The clays may be bentonites, montmorillonites, illites, kaolinites, attapulgites, and other types of conventional clays. Similarly, the weighting agents may be barites, iron oxide, lead oxide, oyster shells, and other conventional weighting agents.

The invention has been found to be of particular advantage for the conversion of an aqueous, oil, or oil-in-water emulsion drilling fluid to a water-in-oil emulsion drilling fluid. An aqueous drilling fluid may be employed in the drilling of a well until a particular formation is reached which desirably is to be drilled with a water-in-oil emulsion drilling fluid. In this case, water-insoluble salt of a sulfuric acid derivative of an organic compound and more particularly a mixture of water-insoluble salt of a sulfonated hydrocarbon and a compound having emulsifying properties and being a water-insoluble salt of a sulfuric acid derivative of an aliphatic ester, a substituted oxazoline, a derivative of a polyoxyalkylene, or an ester of sorbitan may be admixed with oil and the aqueous drilling fluid, which may be a lime base drilling fluid or other type of aqueous drilling fluid, added to the oil. The water-insoluble salt of a resin acid may be also admixed with the oil prior to adding the aqueous drilling fluid. Other desired components of the emulsion would then be added. A similar procedure would be employed where an oil-in-water emulsion drilling fluid is to be converted to a water-in-oil emulsion drilling fluid. Where a drilling fluid whose liquid phase consists substantially entirely of an oil is to be converted to a water-in-oil emulsion drilling fluid, the water-insoluble salt of a sulfuric acid derivative of an organic compound and more particularly a mixture of water-insoluble salt of a sulfonated hydrocarbon and a compound having emulsifying properties and being a water-insoluble salt of a sulfuric acid derivative of an aliphatic ester, a substituted oxazoline, a derivative of a polyoxyalkylene, or an ester of sorbitan, plus the water-insoluble salt of a resin acid and other desired materials, may be admixed with the drilling fluid and water, or aqueous drilling fluid added to the mixture. Where a water-soluble salt of a sulfonated hydrocarbon, a water-soluble salt of a sulfuric acid derivative of an aliphatic ester, or a water-soluble salt of a resin acid are employed, one or all of these compounds may be admixed with the oil. Thereafter, the desired compound for conversion of these water-soluble salts to the corresponding water-insoluble salts may be added to the mixture. Following this, the aqueous drilling fluid, oil-in-water emulsion drilling fluid, or water, whichever is to be employed, is added. A water-insoluble salt of resin acid, if such salt is to be employed, may be added to the emulsion. If a water-soluble salt of a resin acid is to be employed, it may be admixed with the emulsion and thereafter converted to the water-insoluble salt.

The following examples will be illustrative of the invention.

Example 1

In this example, an emulsion suitable for treatment of an oil-producing formation having a temperature below 180° F. was prepared.

Sodium salt of petroleum sulfonate in the amount of 2,910 pounds, sodium salt of sulfonated sperm oil in the amount of 1,245 pounds, and calcium chloride in the amount of 1,200 pounds were admixed with 80 barrels of diesel oil. The sodium salt of petroleum sulfonate was a commercial product containing 62 percent by weight of sulfonate, 33 percent by weight of mineral oil, and 5 percent by weight of water. The molecular weight of the sulfonate was about 457. Thereafter, 70 barrels of water were added to the mixture and the mixture was thoroughly stirred. The resulting emulsion was admixed with 80 barrels of petroleum oil and 70 barrels of water. Thereafter, 3,000 pounds of attapulgite and 900 pounds of lime were added with thorough stirring to the emulsion.

The resulting emulsion had a 30-minute A.P.I. filter loss of zero. Its funnel viscosity was 85 seconds and its Stormer viscosity was 18 centipoises.

This emulsion was successfully employed as a drilling fluid in the drilling of an oil well wherein a maximum temperature of 160° F. was encountered and the emulsion was stable throughout the period of drilling.

Example 2

To 200 barrels of crude petroleum oil were added 4,850 pounds of sodium salt of petroleum sulfonate, 2,060 pounds of sodium salt of sulfonated sperm oil, and 1,500 pounds of calcium chloride. The sodium salt of petroleum sulfonate was the same type of commercial product employed in Example 1. After thorough mixing, there were added 113 barrels of aqueous drilling fluid of the caustic quebracho type. After thorough stirring of the resulting emulsion, 700 pounds of calcium chloride and 87 barrels more of the aqueous drilling fluid were added. Calcium hydroxide in the amount of 1,200 pounds was then added and sufficient barite was added to bring the weight of the emulsion to 9.2 pounds per gallon.

The emulsion had an A.P.I. 30-minute filter loss of 0.1 cc. of oil. Its funnel viscosity was 123 seconds, and its Stormer viscosity was 53 centipoises.

The emulsion was successfully employed as a drilling fluid for the drilling of an oil well wherein the maximum temperature encountered was 160° F. The emulsion remained stable throughout the drilling period.

Example 3

In this example, there is described an emulsion which may be employed for the treatment of an oil-producing formation wherein a maximum temperature of about 180° F. is encountered.

Sodium salt of petroleum sulfonate in the amount of 4,350 pounds, sodium salt of sulfonated sperm oil in the amount of 2,250 pounds, and calcium chloride in the amount of 1,000 pounds were added to 100 barrels of diesel oil. The sodium salt of petroleum sulfonate was the same type of commercial product employed in the previous examples. To this mixture were added 100 barrels of aqueous drilling fluid of the caustic quebracho type. The aqueous drilling fluid was thoroughly admixed with the oil, after which there were added thereto 150 barrels of crude petroleum oil. After thorough mixing, 150 barrels more of the same type of drilling fluid, 1,500 pounds of calcium chloride, and 2,500 pounds of calcium hydroxide were added to the mixture. The mixture was stirred and 2,500 pounds of sodium tall oil soap were added.

The resulting emulsion had a 30-minute A.P.I. fluid loss of zero. Its density was 8.3 pounds per gallon and it had a funnel viscosity of 130 seconds and a Stormer viscosity of 65 centipoises.

This emulsion was successfully employed as a drilling fluid for the drilling of an oil well wherein the maximum temperature encountered was 180° F. and the emulsion remained stable.

Example 4

In this example, there is described an emulsion which may be employed for the treatment of an oil-producing formation having a temperature of 190° F.

To 350 barrels of crude petroleum oil were added 7,000 pounds of sodium salt of petroleum sulfonate, 3,500 pounds of sodium salt of sulfonated sperm oil, and 1,400 pounds of calcium chloride. The sodium salt of petroleum sulfonate was the same type of commercial product employed in the previous examples. To this mixture were then added 350 barrels of aqueous drilling fluid of the caustic quebracho type. After thorough mixing, there were added 2,100 pounds more of calcium chloride and 1,400 pounds of calcium hydroxide. The mixture was thoroughly stirred and 700 pounds of sodium salt of wood rosin and 700 pounds more of calcium hydroxide were added. The 30-minute A.P.I. fluid loss of the emulsion was zero after the addition of the linseed oil.

A.P.I. fluid loss of the emulsion was zero after the addition of the linseed oil.

The emulsion had a density of 8.1 pounds per gallon, a funnel viscosity of 115 seconds, and a plastic viscosity of 35 centipoises.

The emulsion was successfully employed as a drilling fluid for the drilling of an oil well wherein the maximum temperature encountered was 190° F. and the emulsion remained stable.

Having thus described my invention, it will be understood that such description has been given by way of illustration and example and not by way of limitation, reference for the latter purpose being had to the appended claims.

I claim:
1. A fluid for the treatment of an oil-producing formation comprising an emulsion of water-in-oil and containing admixed therewith about 5 to about 15 pounds per barrel of emulsion of a polyvalent metal salt of petroleum sulfonate, and about 2.5 to about 7.5 pounds per barrel of emulsion of a polyvalent metal salt of sulfonated sperm oil.

2. The fluid of claim 1 containing additionally a polyvalent metal salt of a natural resin acid in an amount of about five pounds per barrel of said emulsion.

3. The fluid of claim 2 containing additionally a drying oil in an amount sufficient to reduce filter loss of said fluid.

4. The fluid of claim 3 containing additionally a phenol-formaldehyde resin in an amount sufficient to reduce filter loss of said fluid.

5. The fluid of claim 1 containing additionally a water-soluble salt of an alkaline earth metal in an amount sufficient to enhance the stability of said emulsion.

6. The fluid of claim 5 containing additionally a polyvalent metal salt of a natural resin acid in an amount of about five pounds per barrel of said emulsion.

7. The fluid of claim 6 containing additionally a drying oil in an amount sufficient to reduce filter loss of said fluid.

8. The fluid of claim 7 containing additionally a phenol-formaldehyde resin in an amount sufficient to reduce filter loss of said fluid.

9. The fluid of claim 1 containing additionally an alkaline earth metal hydroxide in an amount sufficient to stabilize said emulsion.

10. The fluid of claim 9 containing additionally a polyvalent metal salt of a natural resin acid in an amount of about five pounds per barrel of said emulsion.

11. The fluid of claim 10 containing additionally a drying oil in an amount sufficient to reduce filter loss of said fluid.

12. The fluid of claim 11 containing additionally a phenol-formaldehyde resin in an amount sufficient to reduce filter loss of said fluid.

13. The fluid of claim 12 containing additionally a water-soluble salt of an alkaline earth metal in an amount sufficient to enhance the stability of said emulsion.

14. A fluid for the treatment of an oil-producing formation comprising an emulsion of water-in-oil and containing admixed therewith about 5 to about 15 pounds per barrel of emulsion of a polyvalent metal salt of a mahogany petroleum sulfonate, and about 2.5 to about 7.5 pounds per barrel of emulsion of a polyvalent metal salt of sulfonated sperm oil.

15. A fluid for the treatment of an oil-producing formation comprising an emulsion of water-in-oil and containing admixed therewith about 5 to about 15 pounds per barrel of emulsion of a polyvalent metal salt of petroleum sulfonate and about 2.5 to about 7.5 pounds per barrel of emulsion of a polyvalent metal salt of a sulfuric acid derivative of an aliphatic ester selected from the group consisting of sperm oil, whale oil, fish oil, seal oil, cottonseed oil, olive oil, rapeseed oil and peanut oil.

16. A composition for use in the treatment of an oil-producing formation comprising a polyvalent metal salt of petroleum sulfonate and, in an amount of about ½ the amount of said polyvalent metal salt of said petroleum sulfonate, a polyvalent metal salt of a sulfuric acid derivative of an aliphatic ester selected from the group consisting of sperm oil, whale oil, fish oil, seal oil, cottonseed oil, olive oil, rapeseed oil and peanut oil.

17. A composition for use in the treatment of an oil-producing formation comprising a polyvalent metal salt of petroleum sulfonate and, in an amount of about ½ the amount of said polyvalent metal salt of said petroleum sulfonate, a polyvalent metal salt of sulfonated sperm oil.

18. A composition for the treatment of an oil-producing formation comprising a water-in-oil emulsion containing a polyvalent metal salt of petroleum sulfonate and, in an amount of about ½ the amount of said polyvalent metal salt of said petroleum sulfonate, a polyvalent metal salt of a sulfuric acid derivative of an aliphatic ester selected from the group consisting of sperm oil, whale oil, fish oil, seal oil, cottonseed oil, olive oil, rapeseed oil and peanut oil.

19. A composition for the treatment of an oil-producing formation comprising a water-in-oil emulsion containing a polyvalent metal salt of petroleum sulfonate and, in an amount of about ½ the amount of said polyvalent metal salt of said petroleum sulfonate, a polyvalent metal salt of sulfonated sperm oil.

20. A fluid having application as a well drilling and completion fluid comprising a water-in-petroleum oil emulsion, solid particles dispersed in said fluid, and an emulsifying agent comprising a polyvalent metal salt of sulfated sperm oil.

21. A fluid having application as a well drilling and completion fluid comprising a water-in-oil emulsion containing at least 40% oil, solid particles dispersed in said fluid, said emulsion containing an emulsifying agent comprising a polyvalent metal salt of sulfated sperm oil, and a calcium electrolyte in the aqueous phase for minimizing hydration of hydratable intergranular clays in oil bearing sands.

22. In a process for the treatment of an oil-producing formation penetrated by a well borehole the step comprising placing in said well borehole to contact said formation a water-in-oil emulsion formed from water, oil, about 5 to about 15 pounds per barrel of emulsion of a polyvalent metal salt of petroleum sulfonate and about 2.5 to about 7.5 pounds per barrel of emulsion of a polyvalent metal salt of a sulfuric acid derivative of an aliphatic ester selected from the group consisting of sperm oil, whale oil, fish oil, seal oil, cottonseed oil, olive oil, rapeseed oil and peanut oil.

23. In a process for the treatment of an oil-producing formation penetrated by a well borehole the step comprising placing in said well borehole to contact said formation a water-in-oil emulsion formed from water, oil, about 5 to about 15 pounds per barrel of emulsion of a polyvalent metal salt of petroleum sulfonate and about 2.5 to about 7.5 pounds per barrel of emulsion of a polyvalent metal salt of sulfonated sperm oil.

24. In a process for the treatment of an oil-producing formation penetrated by a well borehole the step comprising placing in said well borehole to contact said formation a water-in-oil emulsion formed from water, oil, about 5 to about 15 pounds per barrel of emulsion of a polyvalent metal salt of a mahogany petroleum sulfonate and about 2.5 to about 7.5 pounds per barrel of emulsion of a polyvalent metal salt of sulfonated sperm oil.

25. In a process for the treatment of an oil-producing formation penetrated by a well borehole, the step comprising placing in said well borehole to contact said formation a water-in-oil emulsion formed by adding to water and oil a water-soluble salt of petroleum sulfonate and a water-soluble salt of sulfonated sperm oil, and converting said water-soluble salts to form therefrom polyvalent, water-insoluble salts, the amounts of said water-soluble salts being selected to provide about 5 to about 15 pounds per barrel of emulsion of polyvalent, water-insoluble salt of petroleum sulfonate and to provide about 2.5 to about 7.5 pounds per barrel of emulsion of polyvalent, water-insoluble salt of sulfonated sperm oil.

26. In a process for the treatment of an oil-producing formation penetrated by a well borehole, the step comprising placing in said well borehole to contact said formation a water-in-oil emulsion formed by adding to water and oil a water-soluble salt of petroleum sulfonate and a water-soluble salt of sulfonated sperm oil, and admixing therewith a polyvalent metal salt whose cation will replace the cations of said water-soluble salts to form therefrom the respective polyvalent, water-insoluble salts, the amounts of said water-soluble salts being selected to provide about 5 to about 15 pounds per barrel of emulsion of the polyvalent, water-insoluble salt of petroleum sulfonate and to provide about 2.5 to about 7.5 pounds per barrel of emulsion of the polyvalent, water-insoluble salt of sulfonated sperm oil.

27. In a process for the treatment of an oil-producing formation penetrated by a well borehole the step comprising placing in said well borehole to contact said formation an emulsion in which the continuous phase is oil and the discontinuous phase is water and which contains admixed therewith to stabilize said emulsion of a polyvalent metal salt of petroleum sulfonate in the amount of between about 5 and about 15 pounds per barrel of said emulsion and a polyvalent metal salt of sulfonated sperm oil in the amount between about 2.5 and about 7.5 pounds per barrel of said emulsion.

28. The process of claim 27 wherein said polyvalent metal salts of petroleum sulfonate and sulfonated sperm oil are the calcium salts.

29. A process for preparing an emulsion suitable for treatment of an oil-producing formation having a temperature below 180° F., said emulsion having oil as the continuous phase and water as the discontinuous phase, comprising admixing sodium salt of petroleum sulfonate in the relative amount of about 2,910 pounds, sodium salt of sulfonated sperm oil in the relative amount of about 1,245 pounds, and calcium chloride in the relative amount of 1,200 pounds with diesel oil in the relative amount of about 80 barrels to form a mixture, adding to said mixture water in the relative amount of about 70 barrels, stirring said mixture, admixing with said mixture petroleum oil in the relative amount of about 80 barrels and water in the relative amount of about 70 barrels, thereafter adding to said mixture attapulgite in the relative amount of about 3,000 pounds and lime in the relative amount of about 900 pounds, and stirring said mixture.

30. A process for preparing an emulsion suitable as a drilling fluid for the drilling of an earth well wherein the maximum temperature is 160° F., said emulsion having oil as the continuous phase and water as the discontinuous phase, comprising adding to crude petroleum oil in the relative amount of about 200 barrels sodium salt of petroleum sulfonate in the relative amount of about 4,850 pounds, sodium salt of sulfonated sperm oil in the relative amount of about 2,060 pounds, and calcium chloride in the relative amount of about 1,500 pounds to form a mixture, stirring said mixture, adding to said mixture aqueous drilling fluid of the caustic quebracho type in the relative amount of about 113 barrels, stirring said mixture, and adding to said mixture additional calcium chloride in the relative amount of about 700 pounds, additional said aqueous drilling fluid in the relative amount of about 87 barrels, calcium hydroxide in the relative amount of about 1,200 pounds, and barite to bring the weight of the mixture to about 9.2 pounds per gallon.

31. A process for preparing an emulsion suitable for treatment of an oil-producing formation wherein the maximum temperature is about 180° F., said emulsion having oil as the continuous phase and water as the discontinuous phase, comprising adding sodium salt of petroleum sulfonate in the relative amount of about 4,350 pounds, sodium salt of sulfonated sperm oil in the relative amount of about 2,250 pounds, and calcium chloride in the relative amount of 1,000 pounds to diesel oil in the relative amount of about 100 barrels to form a mixture, adding to said mixture aqueous drilling fluid of the caustic quebracho type in the relative amount of about 100 barrels, stirring said mixture, adding to said mixture crude petroleum oil in the relative amount of about 150 barrels, stirring said mixture, adding to said mixture additional said aqueous drilling fluid in the relative amount of about 150 barrels, additional calcium chloride in the relative amount of about 1,500 pounds, and calcium hydroxide in the relative amount of about 2,500 pounds, stirring said mixture, and adding to said mixture sodium tall oil soap in the relative amount of about 2,500 pounds.

32. A process for preparing emulsion suitable for the treatment of an oil-producing formation having a temperature of 190° F., said emulsion having oil as the continuous phase and water as the discontinuous phase, comprising adding to crude petroleum oil in the relative amount of about 350 barrels sodium salt of petroleum sulfonate in the relative amount of about 7,000 pounds, sodium salt of sulfonated sperm oil in the relative amount of about 3,500 pounds, and calcium chloride in the relative amount of about 1,400 pounds to form a mixture, adding to said mixture aqueous drilling fluid of the caustic quebracho type in the relative amount of about 350 barrels, stirring said mixture, adding to said mixture additional calcium chloride in the relative amount of about 2,100 pounds and calcium hydroxide in the relative amount of about 1,400 pounds, stirring said mixture, adding to said mixture sodium salt of wood rosin in the relative amount of about 700 pounds, additional calcium hydroxide in the relative amount of about 700 pounds, and linseed oil in the relative amount of about 400 pounds, and stirring said mixture.

33. A method of drilling oil-producing formations with a rotary bit comprising circulation of a drilling fluid to said bit and then to the well surface, said drilling fluid comprising a water-in-oil emulsion with finely divided solids suspended therein and an emulsifier comprising a sulfated sperm oil salt of a bivalent metal.

34. A method of drilling oil-producing formations with a rotary bit comprising circulation of a drilling fluid to said bit and then to the well surface, said drilling fluid comprising a water-in-oil emulsion with finely divided solids suspended therein and an emulsifier comprising the calcium salt of sulfated sperm oil.

35. A method of drilling wells with an aqueous base drilling fluid having solid particles dispersed therein and converting said fluid to a water-in-oil emulsion prior to reaching oil-producing sand which comprises addition of petroleum oil to said fluid until the oil phase exceeds at least approximately 50% of the total fluid volume, said petroleum oil containing a polyvalent metal salt of sulfated sperm oil as an emulsifier.

36. A method of drilling wells with an oil-in-water emulsion containing as an anionic emulsifier an alkali metal salt of sulfated sperm oil, solid particles dispersed in said emulsion, and inverting said oil-in-water emulsion prior to reaching oil bearing sand which comprises addition of petroleum oil to said emulsion until the oil in said emulsion at least exceeds approximately 50% of the total fluid volume, said oil containing an inorganic polyvalent metal salt and vigorously agitating the mixture to obtain a water-in-oil emulsion.

References Cited by the Examiner

UNITED STATES PATENTS

| 2,542,019 | 2/1951 | Fischer | 252—8.5 |
| 2,623,015 | 12/1952 | Fischer | 252—8.5 |
| 2,659,695 | 11/1953 | Faust | 252—49.5 |
| 2,661,334 | 12/1953 | Lummus | 252—8.5 |
| 2,689,219 | 9/1954 | Menaul | 252—8.5 |
| 2,718,498 | 9/1955 | Salathiel | 252—8.5 |
| 2,793,188 | 5/1957 | Swain et al. | 252—8.5 |

JULIUS GREENWALD, *Primary Examiner.*

JOSEPH R. LIBERMAN, *Examiner.*

H. B. GUYNN, *Assistant Examiner.*